United States Patent
Ross

(10) Patent No.: US 9,573,647 B2
(45) Date of Patent: Feb. 21, 2017

(54) SHOCK-ABSORBING HANDGUARDS FOR HANDLE BARS

(71) Applicant: William T. Ross, Avella, PA (US)

(72) Inventor: William T. Ross, Avella, PA (US)

( * ) Notice: Subject to any disclaimer, the term of this patent is extended or adjusted under 35 U.S.C. 154(b) by 0 days.

(21) Appl. No.: 14/824,396

(22) Filed: Aug. 12, 2015

(65) Prior Publication Data

US 2016/0046343 A1     Feb. 18, 2016

Related U.S. Application Data

(60) Provisional application No. 62/036,688, filed on Aug. 13, 2014.

(51) Int. Cl.
*B62K 21/14*     (2006.01)
*B62K 21/12*     (2006.01)

(52) U.S. Cl.
CPC ............ *B62K 21/12* (2013.01); *B62K 21/125* (2013.01)

(58) Field of Classification Search
CPC .................................. B62J 27/00; B62K 21/12
See application file for complete search history.

(56) References Cited

U.S. PATENT DOCUMENTS

| | | | |
|---|---|---|---|
| 3,832,912 A * | 9/1974 | Edwards | B62J 23/00 2/17 |
| 4,438,661 A * | 3/1984 | Cullen | B62K 21/26 74/551.9 |
| D319,992 S | 9/1991 | Acerbis | |
| 5,832,786 A | 11/1998 | Risley | |
| D492,623 S | 7/2004 | DeLanghe et al. | |
| 7,257,873 B2 * | 8/2007 | Laivins | B62J 23/00 16/436 |
| 7,644,642 B2 * | 1/2010 | Paris | B62K 11/14 280/288.4 |
| 8,534,159 B2 | 9/2013 | Laivins et al. | |
| 8,820,191 B2 * | 9/2014 | Laivins | B62J 23/00 74/551.8 |
| 2004/0173046 A1 | 9/2004 | Hancock et al. | |
| 2007/0256514 A1 * | 11/2007 | Laivins | B62J 17/00 74/551.8 |
| 2009/0314125 A1 * | 12/2009 | Mentasti | B62J 23/00 74/551.8 |
| 2012/0234129 A1 * | 9/2012 | Adan | B62J 23/00 74/551.8 |

* cited by examiner

*Primary Examiner* — Vicky Johnson
(74) *Attorney, Agent, or Firm* — The Webb Law Firm

(57) ABSTRACT

A handguard for a handle bar may include a body extending from a first contact point to a second contact point, a flexible member provided on the body, and a shock-absorbing member provided on the body. The flexible member and shock-absorbing member may be located at opposite ends of the body. The shock-absorbing member may include polyurethane. The shock-absorbing member may include a spring. The flexible member may be provided at the first contact point of the body and may include a rubber collar. The flexible member may be formed integral with the body and may include metal. The flexible member may be formed integral with the body and may include plastic. The flexible member may be integral to the handguard. The shock-absorbing member may be provided within the body at the second contact point of the body.

13 Claims, 5 Drawing Sheets

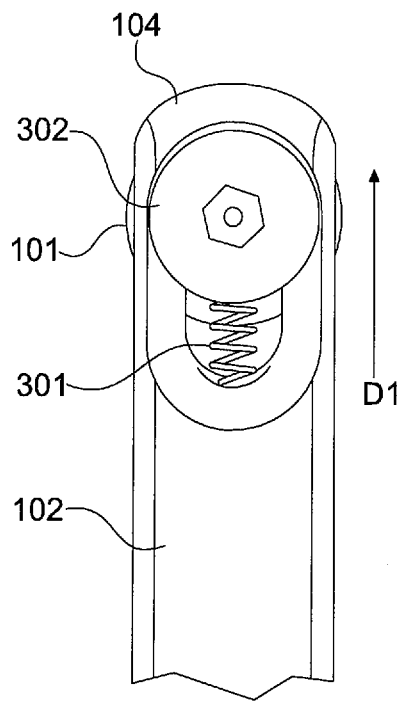
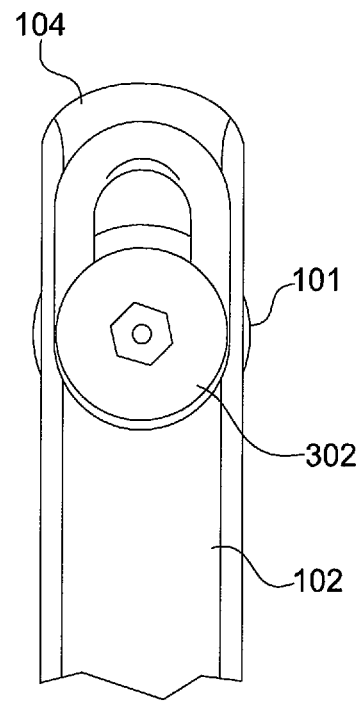
FIG. 3A  FIG. 3B
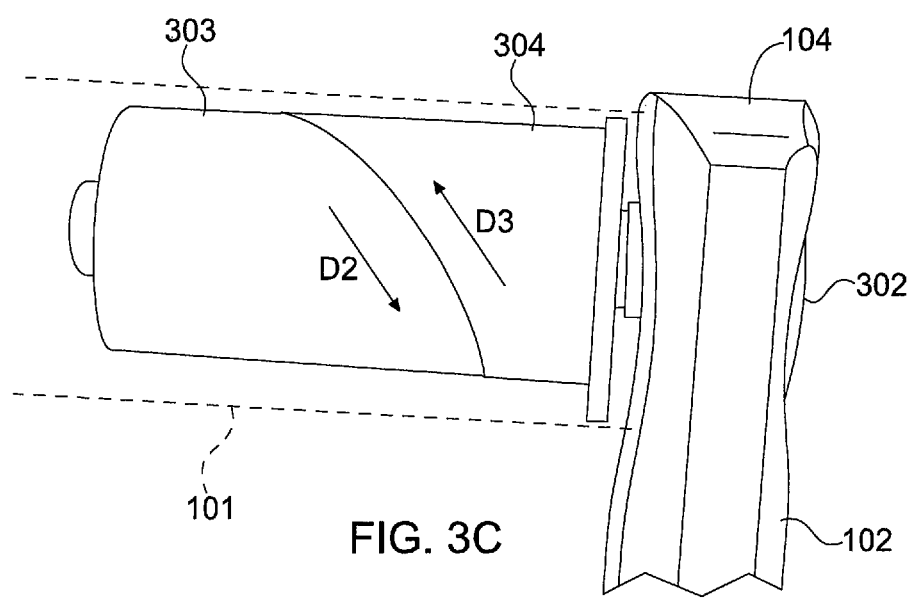
FIG. 3C

SHOCK-ABSORBING HANDGUARDS FOR HANDLE BARS

CROSS-REFERENCE TO RELATED APPLICATION

This application claims the benefit of U.S. Provisional Application No. 62/036,688, filed Aug. 13, 2014, the disclosure of which is incorporated by reference in its entirety.

BACKGROUND OF THE INVENTION

Field of the Invention

The present invention relates generally to handguards. More specifically, the present invention relates a handguards for use on off-road vehicles.

Description of Related Art

Several handguard devices are known in the prior art. Handguards are designed to protect riders of off-road or all-terrain vehicles, such as moto-cross bikes, all-terrain vehicles (ATV), trail bicycles, dirt bikes, etc.

These handguards protect the user's hands from debris, such as tree branches, brushes, rocks, or any other natural formations or foliage which can exist on an off-road path. The handguards of the prior art either provide no shock-absorption or provide ineffective shock absorption. For minor twigs and branches, the handguards without shock absorption may be suitable, but if something large is encountered, the impact between the handguard and the object is directly transferred to the rider's hands, causing potential injury to the rider. In other words, if a handguard collides with a rock at 15 miles per hour, the rider's hands will likewise impact the handle bar at 15 miles per hour. While the handguard may protect the rider's hands from the rock surface, the impact between the rock and the handguard may cause an injury to the rider's hands or arms.

The handguards of the prior art can also create dangerous conditions for other riders as well. An impact between the handguard and debris could jolt the handguard, forcing the handle bar to move out of position. In such an event, the vehicle will be forced into a new direction, which could cause a crash.

The handguards in the prior art with moveable parts are to protect the rider's hands in the case of a forward impact, meaning that the rider lets go of the handle bar and their hands extend towards the handguard. This protects the rider if his or her hands come off the handle bar, but does not provide shock absorption in the opposite direction. Therefore, a need exists for a handguard which protects the rider's hands from the debris itself, as well as lessening the impact on the handle bar caused by the debris.

SUMMARY OF THE INVENTION

Accordingly, and generally, a handguard is provided to address and/or overcome some or all of the deficiencies or drawbacks associated with current handguards.

According to one aspect of the disclosure, a handguard for a handle bar includes a body extending from a first contact point to a second contact point, a flexible member provided on the body, and a shock-absorbing member provided on the body. The flexible member and shock-absorbing member may be located at opposite ends of the body.

The shock-absorbing member may include a compressible member. The compressible member may include a spring or polyurethane. The flexible member may be provided at the first contact point of the body and may include a rubber collar. The flexible member may be formed integral with the body and may include metal. The flexible member may be formed integral with the body and may include plastic. The flexible member may be integral to the handguard. The shock-absorbing member may be provided within the body at the second contact point of the body. The shock-absorbing member may be configured to move from an uncompressed first position to a compressed second position when a force is applied to the handguard.

According to another aspect of the disclosure, a handlebar assembly may include a handle bar comprising a first side and a second side, and at least one handguard provided on the handle bar. The handguard may include a body extending from a first contact point to a second contact point, a flexible member provided on the body, and a shock-absorbing member provided on the body. The flexible member and shock-absorbing member may be located at opposite ends of the body.

The shock-absorbing member may include a compressible member. The compressible member may include a spring or polyurethane. The flexible member may be provided at the first contact point of the body and may include a rubber collar. The flexible member may be formed integral with the body and may include metal. The flexible member may be integral to the handguard. The shock-absorbing member may be provided within the body at the second contact point of the body. The shock-absorbing member may be configured to move from an uncompressed first position to a compressed second position when a force is applied to the handguard. The at least one handguard may include a first handguard on the first side of the handlebar and a second handguard on the second side of the handlebar. The flexible member of the first handguard may be provided as a rubber collar at the first contact point of the body of the first handguard, and the flexible member of the second handguard may be provided as a rubber collar at the first contact point of the body of the second handguard. The shock-absorbing member of the first handguard may include a compressible filler, and the shock-absorbing member of the second handguard may include a compressible filler.

These and other features and characteristics of the handguard, as well as the functions of the elements of the handguard, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 3A is a detailed side view of a shock-absorbing member in a resting position;

FIG. 3B is a detailed side view of a shock-absorbing member when a force is applied thereto;

FIG. 3C is a cross-sectional view of a shock-absorbing end of the handguard of FIG. 1;

DESCRIPTION OF THE PREFERRED EMBODIMENTS

Figure 1:
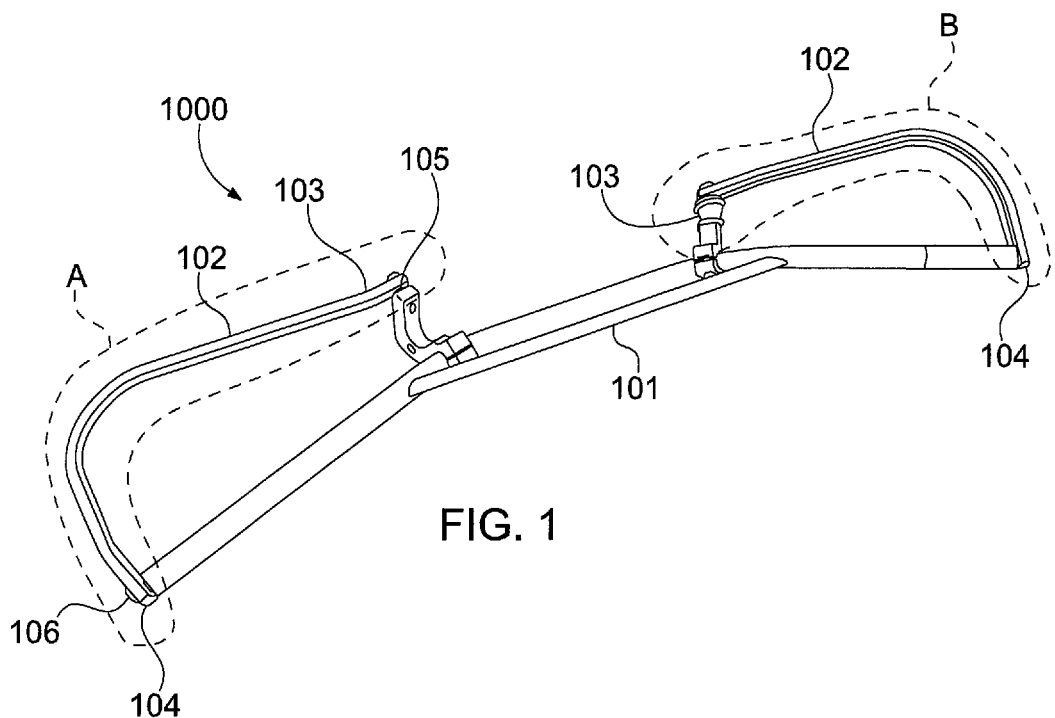
FIG. 1 is a perspective view of a shock-absorbing handguard according to the present disclosure.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, handguards are devices which protect the rider from debris. Debris can include any natural structures or formations, such as branches, trees, rocks, etc., or any human-made structures such as fencing, signage, guide posts, etc. The handguards are preferably made of plastic or metal, but they can be any material strong enough to withstand the impact of the debris.

FIG. 1 depicts an exemplary embodiment of the shock-absorbing handguard system 1000. The handle bar 101 is provided with a handguard 102 where the rider's hands are placed. The handguards 102 each have a main body and are each connected to the handle bar 101 at a first contact point 105 and a second contact point 106. The handguards 102 each have a flexible member 103 at or near the first contact point 105 and a shock absorbing end 104 which is at or near the second contact point 106. FIG. 1 depicts two alternate embodiments for the flexible member 103. In one embodiment, as seen in section "A," the flexible member 103 is integral to the handguard 102, at or near the first connection point 105. In the second embodiment of section "B," the flexible member 103 can be a spring or collar which is integral to, and part of the first connection point 105. Both embodiments are shown in FIG. 1, but it is preferable that both sides of the handguard 102, sections "A" and "B", have the same type of flexible member 103.

The handle bar 101 is generally round to allow for gripping by the user, and can be made of any variety of materials. The choice of material will depend largely on the rider's or the industry's preferences. Certain factors which determine the handle bar 101 materials of construction include stiffness, scratch or abrasion resistance, cost of production, etc. The most common materials are metals and plastics. Further, the handle bar 101 can have a covering to protect the handle bar 101, provide comfort to the rider, and reduce fatigue for the rider. Examples of coverings include rubber or foam coverings. The coverings can be the same shape as the handle bar 101, or they can be contoured to provide greater comfort to the rider.

The handguard 102 can likewise be made of a variety of materials. Like the handle bar 101, the handguard 102 is preferably made of metal or plastic. However, the handguard 102 can be made of any material that is strong enough to withstand impacts from debris. If the material is too brittle or weak, a strong collision could break the handguard 102 and injure the rider's hands. Other considerations for the handguard 102 material of construction include flexibility, scratch or abrasion resistance, cost of production, etc.

FIG. 1 depicts the handguard 102 as a curved metal bar. However, the handguard 102 can be any variety of shapes. The wider the handguard 102, the larger the area of the handguard 102 that can protect the rider's hands. At the same time, as the handguard 102 is made wider, it provides more air resistance. To combat this, aerodynamic designs, such as a "teardrop" shape can provide a suitable medium. With a "teardrop" shape, the wider portion of the handguard 102 is placed in front of the rider's hands, but the shape lowers wind resistance by minimizing material where protection is less needed.

The non-limiting but preferred embodiment of the handguard 102 includes a curvature. This allows for the debris to be deflected from the handguard 102, thereby minimizing the impact felt by the rider. However, there may be some instances where a flat handguard 102 is preferable.

Figure 2:
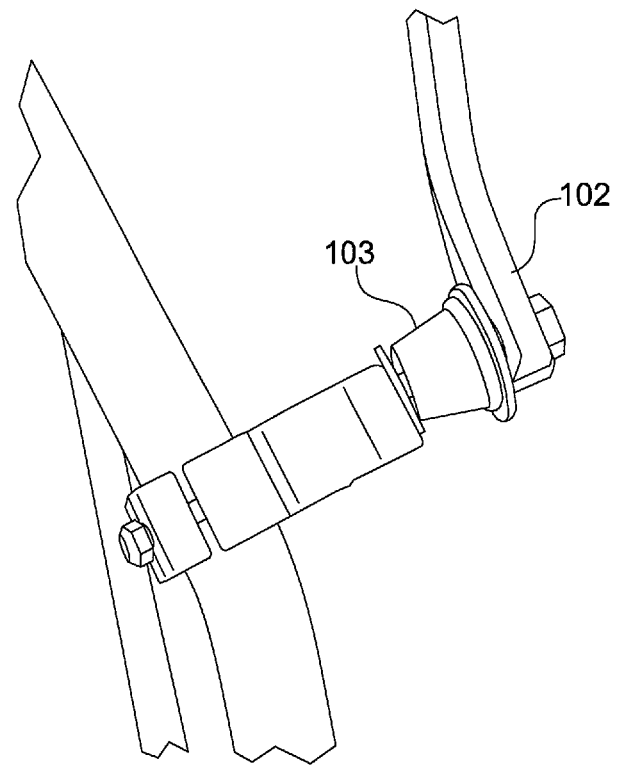
FIG. 2 is a detailed view of section "C" in FIG. 1.

FIG. 2 shows a detailed view of the flexible member 103 as it connects to the handguard 102. As seen in FIG. 2, the flexible member 103 can be any elastic or compressible material, such as a rubber washer or collar as shown. Alternatively, the flexible member could be integral to the handguard 102, such that the first end of the handguard 102 could be a flexible metal, plastic, or a spring.

Figure 7:
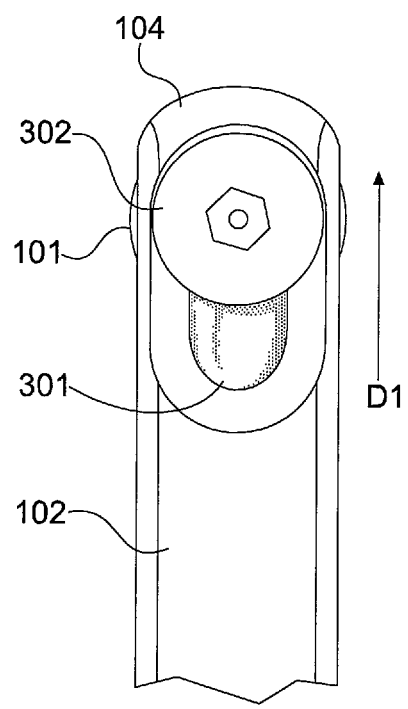
FIG. 7 is a side view of another shock-absorbing member in a rest position.

FIG. 3A shows a detailed view of the shock absorbing end 104. The shock absorbing end 104 includes a shock-absorbing member 301. The shock-absorbing member 301 can be any device which provides resilient resistance when a force is applied upon it. For example, the shock-absorbing member 301 could be a compressible member such as a spring, a gas shock, a compressible foam or rubber, polyurethane, etc. For example, according to another aspect of this disclosure and shown in FIG. 7, the shock-absorbing member 301 may be a block of polyurethane provided within the shock absorbing end 104. It is contemplated that the type of polyurethane provided in the shock absorbing end 104 may be chosen based on its stiffness according to the desired amount of shock absorption to be attained from the handguard 102. It is also contemplated that multiple types of polyurethane can be provided in the shock absorbing end 104 to provide a gradual shock absorption. Whichever material is used, it should provide sufficient resistance to a force acting upon it so that the rider does not feel all of the impact and also to avoid substantial wrenching of the handle bar 101 upon impact of debris with the handguard 102. For example, if the shock-absorbing member 301 is a spring, the spring should have a sufficiently high spring constant, or stiffness, such that the impact is reduced. If the stiffness is too high, the impact of small collisions may be directly imparted on the rider and/or handle bar 101. Likewise, if the stiffness is too low, the handguards 102 may shake and rattle and provide little shock absorption for large impacts.

The handguards 102 include a connector 302 to secure the shock-absorbing member 301. The connector 302 can be any connection device which prevents the shock absorbing end 104 from coming undone. This is most easily accomplished with a head that is thicker in diameter than the width of the slot where the shock-absorbing member 301 is located. For example, the connector 302 could be a screw with a washer, a screw by itself, a plate, a disc, a T-shaped piece of metal or plastic, a bearing in a track, or any other mechanism or configuration which secures the shock absorbing end 104.

As a force or impact is applied to the handguard 102, the handle bar 101 moves relative to the handguard 102 in direction D1. The handguard 102 may move towards the handle bar 101 as well as during impact of an object on the handguard 102. FIG. 3B shows the handguard 102 acting against the shock-absorbing member 301 (not shown in FIG. 3B). As the handguard 102 moves from the position in FIG. 3A to FIG. 3B, the handguard 102 and shock-absorbing member 301 reduce the impact felt by the rider. During the impact, the shock-absorbing member 301 may move from an uncompressed first position to a compressed second position.

FIG. 3C is a cutaway view of the preferred, and non-limiting, embodiment of how the connector 302 secures the shock absorbing end 104 of the handguard 102. Inside the handle bar 101, a first expansion member 303 and a second expansion member 304 are provided. As the connector 302 is actuated, either by turning or pushing the connector 302 toward the handle bar 101, the first expansion member 303 and second expansion member 304 act upon each other and are forced into opposite directions. For example, as the connector 302 is actuated, the first expansion member 303 is moved in a first direction D2, and the second expansion member 304 is moved in a second direction D3. As the first and second expansion members 303, 304 move in their respective directions, D2, D3, they press against the sidewalls of the handle bar 101, thereby securing the handguard 102 to the handle bar 101.

While two expansion members 303, 304 are shown in FIG. 3C, the method to secure the handguard 102 to the handle bar 101 depends on design preferences. For example, the connector 302 could be large enough, or the bore of the handle bar 101 narrow enough, such that the connector 302 screws or otherwise engages directly into the handle bar 101. Other connection devices, such as anchors similar to those used in the concrete, construction, or drywall fields can be used. In these connection devices, as the connector 302 engages the anchor, either through a screw, threading, or lateral force, part of the anchor deforms and expands, thereby pushing against the sidewall of the handle bar 101.

Figure 4:
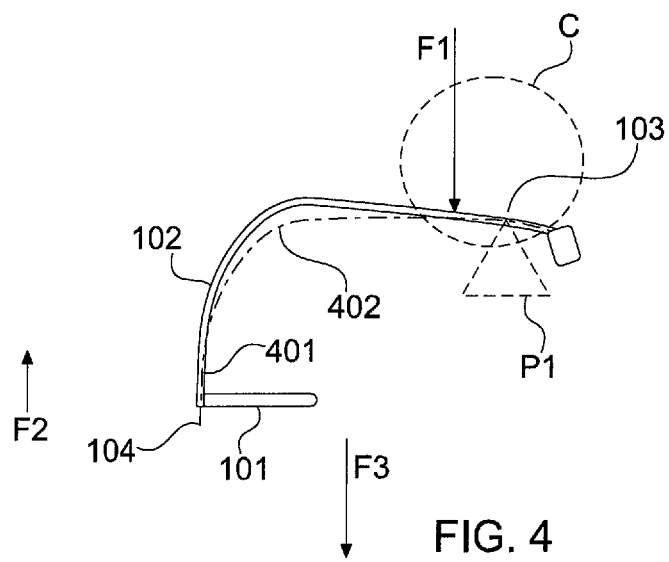
FIG. 4 is a detailed view of section "A" in FIG. 1.

FIG. 4 is a detailed view of section "A" in FIG. 1. FIG. 4 depicts the shock absorbing qualities of the handguard 102 when the flexible member 103 is a part of, or the entirety of, the handguard 102 itself. When the flexible member 103 is part of the handguard 102, the maximum flexion will occur at the point where the force F1 is applied. This area of maximum flexion is depicted in section "C". When a force F1 is applied, the handguard 102 moves from a first position 401 to a second position 402 mostly about the pivot point P1, which acts as a fulcrum at the flexible member 103. In this embodiment, the handguard 102 outside of section "C" remains relatively in the same shape. Because the handle bar 101 is in a fixed position, there will be some flexion outside of section "C" depending on the location, shape, and configuration of the shock absorbing end 104 and handle bar 101. The shock absorbing end 104 provides a force F2 opposite force F1 via the shock-absorbing member 301 (not shown in FIG. 4). In providing an opposing force F2, the force F3 upon the rider's hands is less than the force F1. When the force F2 is equal to or greater than the force F1, the rider may feel nothing. FIG. 4 is provided to show one possible embodiment of how the handguard 102 reacts when a force F1 is applied thereon.

Figure 5:
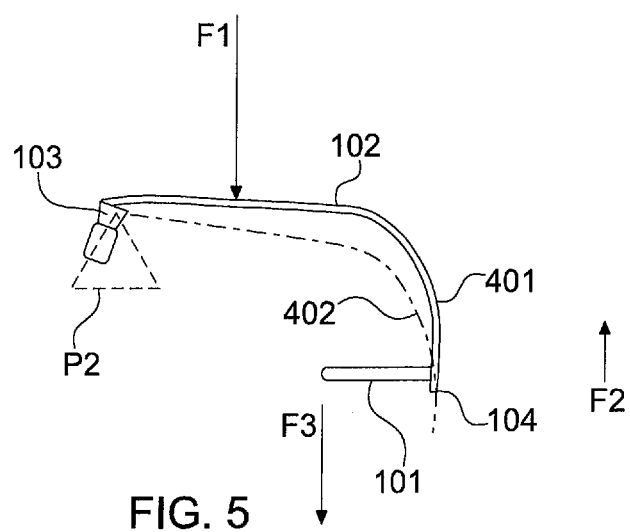
FIG. 5 is a detailed view of section "B" in FIG. 1.

FIG. 5 is a detailed view of section "B" in FIG. 1. FIG. 5 depicts the shock absorbing qualities of the handguard 102 when the flexible portion 103 is a compressible or elastic material located at the interior end of the handguard 102. When the same force F1 is applied, the entire handguard 102 moves from a first position 401 to a second position 402 about the pivot point P2. The flexible member 103 compresses to allow the movement to occur. In this embodiment, the entire handguard 102 remains relatively in the same shape. As in FIG. 4, there will be some flexion in the handguard 102 depending on shape and location of the handle bar 101 and shock absorbing end 104. FIG. 5 is provided as another possible embodiment of how the handguard 102 reacts when a force F1 is applied thereon.

In both FIGS. 4 and 5, the flexible member 103 allows the handguard 102 to move about the first contact point 105 of the handguard 102. The benefit of the flexible member 103 is that it allows the handguard 102 to essentially pivot about pivot points P1 and P2. Thus, the handguard 102 is most preferably a material which is strong enough to provide minimum flexion, while still being moveable about the first contact point 105. If the handguard 102 is too strong to flex or pivot about the pivot points P1 and P2, and no flexible member 103 is provided, the handguard 102 may absorb less of the impact.

Figure 6A:
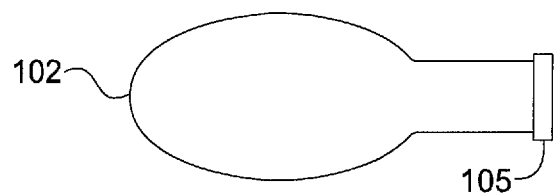
FIG. 6A is a front view of a teardrop-shaped handguard according to this disclosure.
Figure 6B:
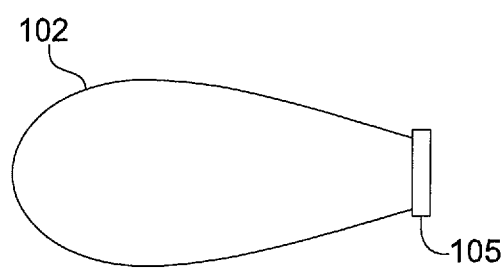
FIG. 6B is a front view of another teardrop-shaped handguard according to this disclosure.
Figure 6C:
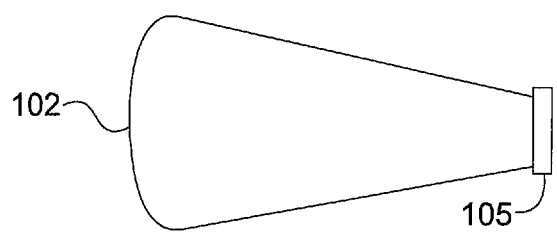
FIG. 6C is a front view of a trapezoidal-shaped handguard according to this disclosure.
Figure 6D:
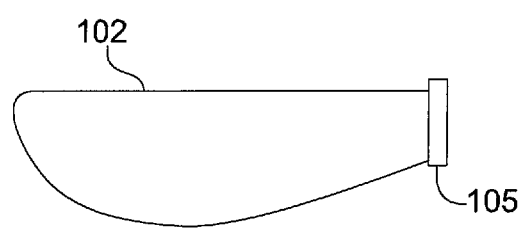
FIG. 6D is a front view of a handguard according to this disclosure including a straight top and a curved bottom.
Figure 6E:
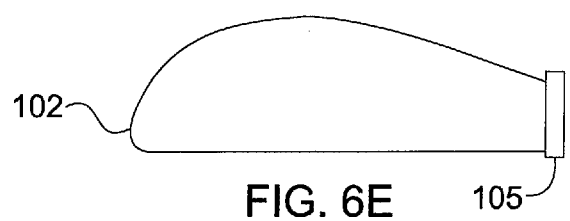
FIG. 6E is a front view of a handguard according to this disclosure including a straight bottom and a curved top.

While straight bars have been shown for the handguard 102, the present application is not limited to just straight handguards 102. For example, FIGS. 6A-6E show different types of handguard 102 shapes which can be used. The views of FIGS. 6A-6E are that of the handguard 102 when looking straight at the handguard 102 which will protect the rider's left hand. For reference, the first contact point 105 is shown in each of the alternative embodiments. FIGS. 6A and 6B show a teardrop shape. In FIG. 6A, the teardrop shape begins at a distance from the first contact point 105. In FIG. 6B, the teardrop shape begins at the first contact point 105. FIG. 6C shows a trapezoidal handguard 102 with rounded corners. FIG. 6D provides an example of a handguard 102 having a straight top and a curved bottom. FIG. 6E provides an example of a handguard 102 having a straight bottom and a curved top.

The shape of the handguard 102 will depend on factors such as material of construction, intended use, and aesthetics. For example, a rider may prefer a relatively straight, metal handguard 102 (as in FIG. 1) in environments where there are a lot of flat rocks or rock walls. The straight metal will provide high strength in an environment where the rider is not overly concerned about debris striking the rider's hands above or below the handguards 102. However, in environments with thick shrubbery, brush, or branches, where the flexible debris can maneuver around the handguards 102, a wider handguard 102 may be preferable, such as those found in FIGS. 6B and 6C.

In a preferred, but non-limiting, embodiment, the handguards 102 are designed such that they are interchangeable with the handle bar 101. This requires a common design among the handguards 102, particularly, where they attach to the handle bar 101, but doing so provides several advantages. The first is that the rider can change the handguard 102 depending on the environment. If the handguards 102 are not interchangeable, a rider may need to switch out the handguard 102 and handle bar 101 each time. Secondly, interchangeable handguards 102 allow a rider to switch out their handguards 102 if the current handguards 102 break or become too damaged to use. In order to accommodate such interchangeability, it is preferable to use connections at the first and second contact points 105, 106 of FIG. 1, which are reversible. In other words, it is preferable to have a connection, such as screw or bolt at the first contact point 105, rather than a weld or rivet.

While various aspects of the handguards were provided in the foregoing description, those skilled in the art may make modifications and alterations to these aspects without departing from the scope and spirit of the invention. For example, it is to be understood that this disclosure contemplates that, to the extent possible, one or more features of any aspect can be combined with one or more features of any other aspect. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A handguard for a handle bar, comprising:
a body extending from a first contact point to a second contact point;
a flexible member provided on the body; and
a shock-absorbing member provided on the body,
wherein the shock-absorbing member includes a compressible member and is configured to permit movement of the body relative to the handle bar,
wherein the flexible member and shock-absorbing member are located at opposite ends of the body, and
wherein the flexible member is provided at the first contact point of the body and comprises a rubber collar.

2. The handguard of claim 1, wherein the compressible member comprises a spring or polyurethane.

3. The handguard of claim 1, wherein the flexible member is integral to the handguard.

4. The handguard of claim 1, wherein the shock-absorbing member is provided within the body at the second contact point of the body.

5. The handguard of claim 1, wherein the shock-absorbing member is configured to move from an uncompressed first position to a compressed second position.

6. A handlebar assembly, comprising:
a handle bar comprising a first side and a second side; and
at least one handguard provided on the handle bar, the handguard comprising:
a body extending from a first contact point to a second contact point,
a flexible member provided on the body; and
a shock-absorbing member provided on the body,
wherein the shock-absorbing member-includes a compressible member and is configured to permit movement of the body relative to the handle bar,
wherein the flexible member and shock-absorbing member are located at opposite ends of the body, and
wherein the flexible member is provided at the first contact point of the body and comprises a rubber collar.

7. The handlebar assembly of claim 6, wherein the compressible member comprises a spring or polyurethane.

8. The handlebar assembly of claim 6, wherein the flexible member is integral to the handguard.

9. The handlebar assembly of claim 6, wherein the shock-absorbing member is provided within the body at the second contact point of the body.

10. The handlebar assembly of claim 6, wherein the shock-absorbing member is configured to move from an uncompressed first position to a compressed second position.

11. The handlebar assembly of claim 6, wherein the at least one handguard comprises a first handguard on the first side of the handlebar and a second handguard on the second side of the handlebar.

12. The handlebar assembly of claim 11, wherein the flexible member of the first handguard is provided as a rubber collar at the first contact point of the body of the first handguard, and the flexible member of the second handguard is provided as a rubber collar at the first contact point of the body of the second handguard.

13. The handlebar assembly of claim 11, wherein the shock-absorbing member of the first handguard is a compressible member, and the shock-absorbing member of the second handguard is a compressible member.

* * * * *